UNITED STATES PATENT OFFICE.

ADOLF GUTENSOHN, OF SOUTHEND, ENGLAND.

FLUX FOR EXTRACTING METALS FROM ORES.

No. 826,568.        Specification of Letters Patent.        Patented July 24, 1906.

Application filed November 3, 1905. Serial No. 285,793.

*To all whom it may concern:*

Be it known that I, ADOLF GUTENSOHN, a subject of the King of Bavaria, German Empire, residing at Southend, county of Essex, England, have invented certain new and useful Improvements in Means for Extracting Metals from Ores and Waste Materials, (Tailings;) and I do hereby declare the following to be a full, clear, and exact description of the invention, such as will enable others skilled in the art to which it appertains to make and use the same.

This invention relates to a special flux or reducing agent for extracting metals from ores or waste material containing the same, and has special reference to ores holding metals in silicious combinations and tailings mixed with silicious impurities.

The salient feature of the invention is the use of borate of manganese with other reducing and slag-liquefying agents. This flux is composed of borate of manganese, carbon, and a slag-liquefying material, preferably fluor-spar. These ingredients are to be finely ground and intimately mixed. I also prefer to add a sticky hydrocarbon, such as gas-tar. This last-mentioned article is not essential, but by its addition the lighter ingredient (the borate of manganese) is prevented from rising out of the heavier ones.

The proportions of the above-mentioned ingredients vary according to the kind of metal to be extracted and the class of ore, but the following give good results for tin, nickel, copper, and zinc: one part borate of manganese, one part carbon, and two parts fluor-spar. For ores containing a very large proportion of silica an increased amount of fluor-spar would be used—say three parts. The carbon preferred to be used would be ground anthracite coal.

The quantity of flux to be used is generally the estimated weight of the metal in the ore; but for rich ores and rich material which can be treated without concentration an additional ten per cent. of the flux may be used to facilitate the fusing of the whole mass and the metal as it settles down to be continually drawn off.

In the treatment of poor ores or low grade material the quantity of the flux will only be the estimated weight of the metal in such ore or material, which when the metal is reduced will form into globules in the slag, which is then to be chilled in water with or without a small quantity of sulfuric acid or alkali, the chilled mass being afterward dried and ground to powder, when the globules, in consequence of their high specific gravity against the other material, can be easily recovered by any of the usual concentrating methods. This flux can be most advantageously used in the distillation of zinc out of ore, as it not only enables the metal to be obtained much quicker and at a lower heat than is now necessary, but prevents the usual rapid destruction of the retorts.

In carrying out the application of the invention the material to be treated is first reduced to fine powder and preferably concentrated to bring the metallic portion to as high a proportion as is possible without loss of metal. The proper quantity of the flux is then to be intimately mixed into the concentrate and the mass heated in a usual furnace to fuse the whole.

If the ore or material to be treated contains arsenic, sulfur, iron, and other impurities, it should be well roasted before the flux is mixed into it.

Having now described my invention, what I desire to secure by Letters Patent of the United States is—

1. A flux for the purposes stated, consisting of the admixture of borate of manganese with carbon and slag-liquefying material, consisting of fluor-spar.

2. A flux for the purposes stated, consisting of an admixture of borate of manganese with carbon and tar, and slag-liquefying material, as described.

In testimony whereof I affix my signature in presence of two witnesses.

ADOLF GUTENSOHN.

Witnesses:
     FREDERIC PRINCE,
     H. D. JAMESON.